(12) United States Patent
Champion (10) Patent No.: US 10,674,669 B2
(45) Date of Patent: Jun. 9, 2020

(54) BALE UNROLLER

(71) Applicant: Champion Mulcher 2000, LLC, Lodi, NY (US)

(72) Inventor: Robert Champion, Lodi, NY (US)

(73) Assignee: Champion Mulcher 2000, LLC, Lodi, NY (US)

(*) Notice: Subject to any disclaimer, the term of this patent is extended or adjusted under 35 U.S.C. 154(b) by 0 days.

(21) Appl. No.: 15/696,600

(22) Filed: Sep. 6, 2017

(65) Prior Publication Data
US 2019/0069486 A1 Mar. 7, 2019

(51) Int. Cl.
*A01D 87/12* (2006.01)

(52) U.S. Cl.
CPC ...... *A01D 87/127* (2013.01); *A01D 2087/128* (2013.01)

(58) Field of Classification Search
CPC ............ A01D 2087/128; A01D 87/127; A01F 29/005; A01F 29/06; A01F 29/01; A01F 29/14; A01F 29/12; A01F 29/10
USPC .... 241/101.74, 101.762, 101.77, 186.4, 262, 241/274, 283, 296, 605; 414/111, 24.5, 414/24.6; 56/341
See application file for complete search history.

(56) References Cited

U.S. PATENT DOCUMENTS

| 3,979,077 | A | | 9/1976 | Dalman | |
|---|---|---|---|---|---|
| 4,101,081 | A | * | 7/1978 | Ritter | A01D 90/083 241/101.74 |
| 4,195,958 | A | | 4/1980 | Vahlkamp et al. | |
| 4,360,167 | A | * | 11/1982 | Beccalori | A01D 87/127 241/274 |
| 4,428,707 | A | * | 1/1984 | Cockle | A01D 87/127 198/669 |
| 4,549,481 | A | | 10/1985 | Groeneveld et al. | |
| 4,564,325 | A | * | 1/1986 | Ackerman | A01D 87/127 414/24.5 |
| 4,621,776 | A | * | 11/1986 | Hostetler | A01D 87/127 241/101.76 |
| 4,643,364 | A | * | 2/1987 | Lucas | A01D 87/127 241/101.76 |
| 4,923,128 | A | * | 5/1990 | Ostrowski | A01F 29/005 241/101.742 |
| 4,968,205 | A | | 11/1990 | Biasotto et al. | |
| 4,982,658 | A | * | 1/1991 | Knudson | A01D 87/127 100/100 |
| 5,340,042 | A | | 8/1994 | Bergkamp et al. | |

(Continued)

FOREIGN PATENT DOCUMENTS

| FR | 2524253 A1 * | 10/1983 | ........... A01D 87/127 |
|---|---|---|---|
| FR | 3002111 A1 * | 8/2014 | ............. A01F 29/00 |

(Continued)

*Primary Examiner* — Gregory W Adams
(74) *Attorney, Agent, or Firm* — Brown & Michaels, PC (57) ABSTRACT

A bale unroller includes a longitude, a bale cutting assembly, and a dispersing assembly. The bale cutting assembly includes a cutting conveyor, and the bale cutting assembly configured to receive the bale on a first side of the cutting conveyor and to cut the bale into a mat. The dispersing assembly has a longitudinally rear end and an exit longitudinally forward from the longitudinally rear end. The dispersing assembly is coupled at the longitudinally rear end with the bale cutting assembly and is configured to receive the mat and feed the mat out the exit along the longitude.

24 Claims, 9 Drawing Sheets

(56) References Cited

U.S. PATENT DOCUMENTS

| | | | | | |
|---|---|---|---|---|---|
| 5,368,238 | A | * | 11/1994 | Bergkamp | A01F 29/005 241/223 |
| 5,865,589 | A | * | 2/1999 | Reyher | A01F 29/005 241/101.742 |
| 5,934,578 | A | * | 8/1999 | Ramer | A01F 29/005 241/101.76 |
| 5,975,444 | A | * | 11/1999 | Ethier | A01F 29/005 241/101.76 |
| 6,027,054 | A | * | 2/2000 | Kaye | A01F 29/005 241/101.74 |
| 6,171,047 | B1 | * | 1/2001 | Vandervalk | A01D 87/126 414/111 |
| 6,431,480 | B1 | * | 8/2002 | Hruska | A01F 29/005 241/101.76 |
| 7,566,019 | B1 | * | 7/2009 | Dueck | A01F 29/005 241/277 |
| 7,788,858 | B1 | * | 9/2010 | Ammons | B66C 23/44 212/180 |
| 7,793,873 | B2 | * | 9/2010 | Hoovestol | A01F 29/005 241/101.76 |
| 8,091,816 | B2 | * | 1/2012 | Curles | A01F 29/005 241/200 |
| 8,474,740 | B2 | * | 7/2013 | Neudorf | A01D 87/127 241/277 |
| 2002/0018702 | A1 | * | 2/2002 | Stredwick | A01D 87/127 414/111 |
| 2010/0219275 | A1 | * | 9/2010 | Weiss | A01F 29/005 241/101.76 |
| 2014/0077014 | A1 | * | 3/2014 | Cooper | A01F 29/005 241/165.5 |
| 2014/0239106 | A1 | * | 8/2014 | Graham | B02C 13/04 241/194 |
| 2015/0342122 | A1 | * | 12/2015 | Egging | A01D 87/0007 241/27 |
| 2016/0128279 | A1 | * | 5/2016 | Van Bentzinger | A01D 90/02 414/111 |

FOREIGN PATENT DOCUMENTS

| | | | |
|---|---|---|---|
| KR | 100834707 | B1 * | 6/2008 |
| KR | 100906028 | B1 * | 7/2009 |
| TW | 201350012 | A * | 12/2013 |

\* cited by examiner

BALE UNROLLER

BACKGROUND OF THE INVENTION

Field of the Invention

The invention pertains to the field of agricultural machinery. More particularly, the invention pertains to apparatus for loading, handling, and unrolling round bales.

Description of Related Art

De-balers, including bale shredders, choppers, and cutters serve to shred, chop, grind, or otherwise de-bale a single round bale, often to disperse, by blowing the de-baled material (e.g., straw). Some de-balers are used to spread straw in a field where livestock graze, or sometimes to spread straw as animal bedding or liquid absorbent. The de-balers are loaded with a single bale at a time, and drawn by a tractor or other vehicle across an area, such as a field, where the de-baler removes straw from the bale and disperses the straw in areas to a left or a right side of the vehicle and de-baler. The limited bale capacity of these de-balers requires expense of time to frequently reload bales. Further, when blowing straw to the sides of the vehicle and de-baler, an operator has limited control over where the straw lands, or how evenly it distributes. Wind, for example, can blow ground straw over wide areas where cover is unnecessary or undesirable. Furthermore, some confined spaces are difficult to cover where de-baler travel paths are restricted.

SUMMARY OF THE INVENTION

In the agricultural industry, such as with a crop farm or at a vineyard, it is sometimes desirable to lay ground cover between rows of the crop or vines, to suppress other vegetation growth or to cover mud. According to one embodiment, a bale unroller includes a longitude, a bale cutting assembly, and a dispersing assembly. The bale cutting assembly includes a cutting conveyor, and the bale cutting assembly is configured to receive the bale on a first side of the cutting conveyor and to cut the bale into a mat. The dispersing assembly has a longitudinally rear end and an exit longitudinally forward from the longitudinally rear end. The dispersing assembly is coupled at the longitudinally rear end with the bale cutting assembly and is configured to receive the mat and feed the mat out the exit along the longitude.

According to another embodiment, an apparatus for de-baling a bale includes a frame, a bale cutting assembly, and a dispersing assembly. The frame has a forward end, a rearward end, a first lateral side, a second lateral side, a top side, and a bottom side. The first lateral side and the second lateral side are on opposing sides of the frame, the first lateral side and the second lateral side extending from the rearward end to the forward end, the top side and the bottom side on opposing sides of the frame, the top side and the bottom side extending between the forward end, the rearward end, the first lateral side, and the second lateral side. The bale cutting assembly is on the top side of the frame, and the dispersing assembly is on the top side of the frame. The bale cutting assembly is configured to receive the bale and to cut the bale into a mat. The dispersing assembly is coupled to the frame forward of the cutting assembly at the forward end of the frame The dispersing assembly is configured to feed the mat out of the apparatus forward from the bale cutting assembly between the first lateral side and the second lateral side.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

In various embodiments, components described herein as being a "belt" can be interchanged with a "chain" or another now-known or future-developed drivable device to transport items between locations. The terms "belt" and "chain" are used interchangeably.

Figure 1:
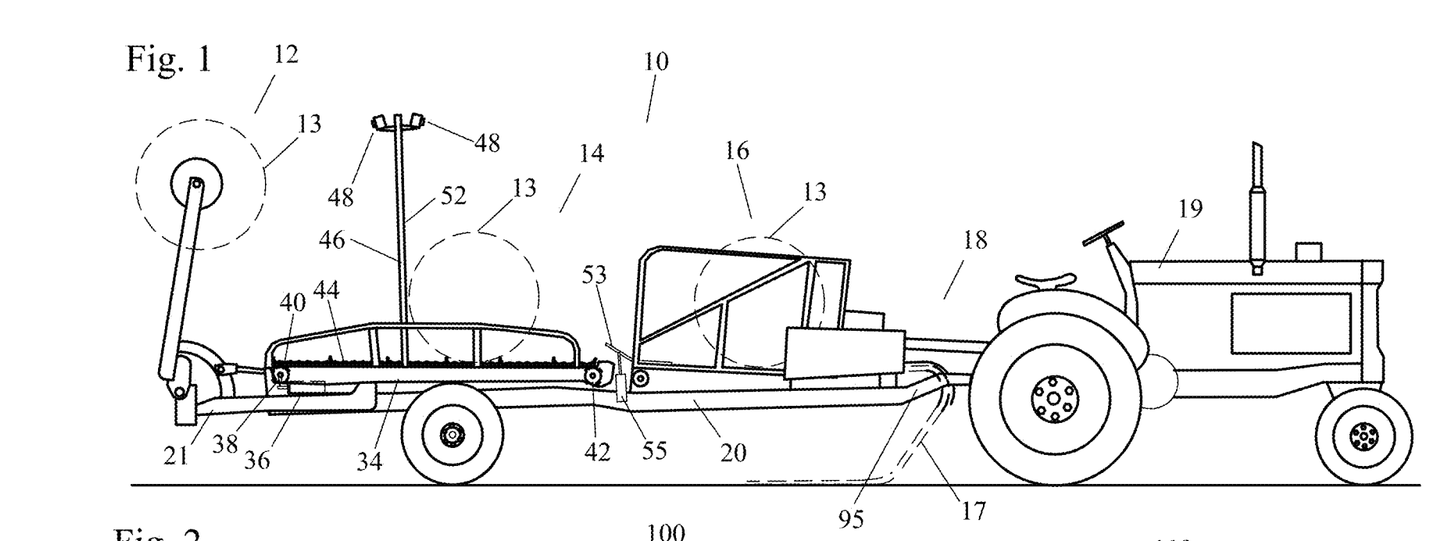
FIG. 1 shows a side view of an apparatus for loading, handling, and un-baling bales, according to a towed embodiment.

As discussed above, in the agricultural industry, such as with a crop farm or at a vineyard, it is sometimes desirable to lay ground cover between rows of the crop or vines, to suppress other vegetation growth or to cover mud. The present disclosure pertains to an apparatus for loading, handling, and unbaling, bales (e.g., a de-baler or bale unroller), in order to disperse the bale material in a suitable fashion to blanket ground areas between rows of crops, such as grape vines. The bales can be round or other shapes. In FIG. 1, a side view of such an apparatus 10 is illustrated. The apparatus 10 includes a bale picking assembly 12 configured to pick a bale 13 from the ground or another location and release the bale 13 on a bale conveying assembly 14, which is coupled to the bale picking assembly 12. In alternative embodiments, the bale conveying assembly 14 can be omitted, and the bale picking assembly 12, can release the bale 13 directly onto a bale cutting assembly 16. Referring again to the embodiment depicted in FIG. 1, the bale conveying assembly 14 is configured to receive the bale 13 from the bale picking assembly 12 and to convey the bale 13 to the bale cutting assembly 16, which is coupled with the bale conveying assembly 14. The bale cutting assembly 16 is configured to receive the bale 13 from the bale conveying assembly 14 and to cut the bale 13 into a mat 17. The mat 17 is less likely than ground, smaller-cut, or more loosely cut straw to be moved by wind or other natural elements, both during dispersion and after dispersion to the ground. A dispersing assembly 18, which is coupled with the bale cutting assembly 16, is configured to receive the mat 17 and feed the mat 17 out of the apparatus 10 beneath the apparatus 10. The bale picking assembly 12, bale conveying assembly 14, bale cutting assembly 16, and dispersing assembly 18 can be connected by and/or supported by a frame 20.

Figure 2:
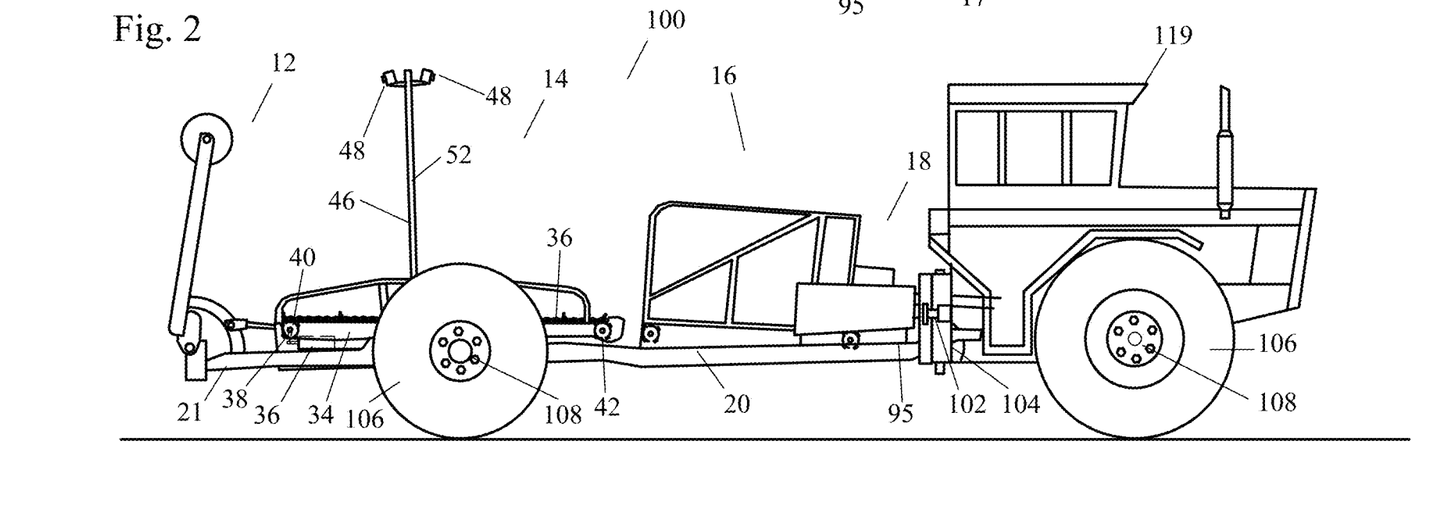
FIG. 2 shows a side view of an apparatus for loading, handling, and un-baling bales, according to a self-propelled embodiment.

FIG. 2 shows a side view of an apparatus 100 similar to the apparatus 10 of FIG. 1, which differs in that in the embodiment of FIG. 1, the apparatus 10 is pulled as a trailer connected to a tractor 19, in the embodiment of FIG. 1 the apparatus 100 is self-propelled. In such a self-propelled embodiment, the apparatus 100 is provided with a power cab 119 which houses the operator position and engine. Power from the engine can be transmitted to the ground wheels 106 by conventional drive shafts and differentials, or the apparatus 100 can be propelled by hub motors 108, supplied with electrical or hydraulic power by the engine in the power cab 119, as is common in heavy equipment. The apparatus 100 can be steered by swiveling the front wheels like a car or farm tractor. Alternatively, as shown in FIG. 2, the apparatus 100 can be articulated on a pivot 104 coupling the power cab 119 to the frame 20, with hydraulic cylinders 102 causing the apparatus 100 to bend, again as is common in heavy equipment.

Figure 3:
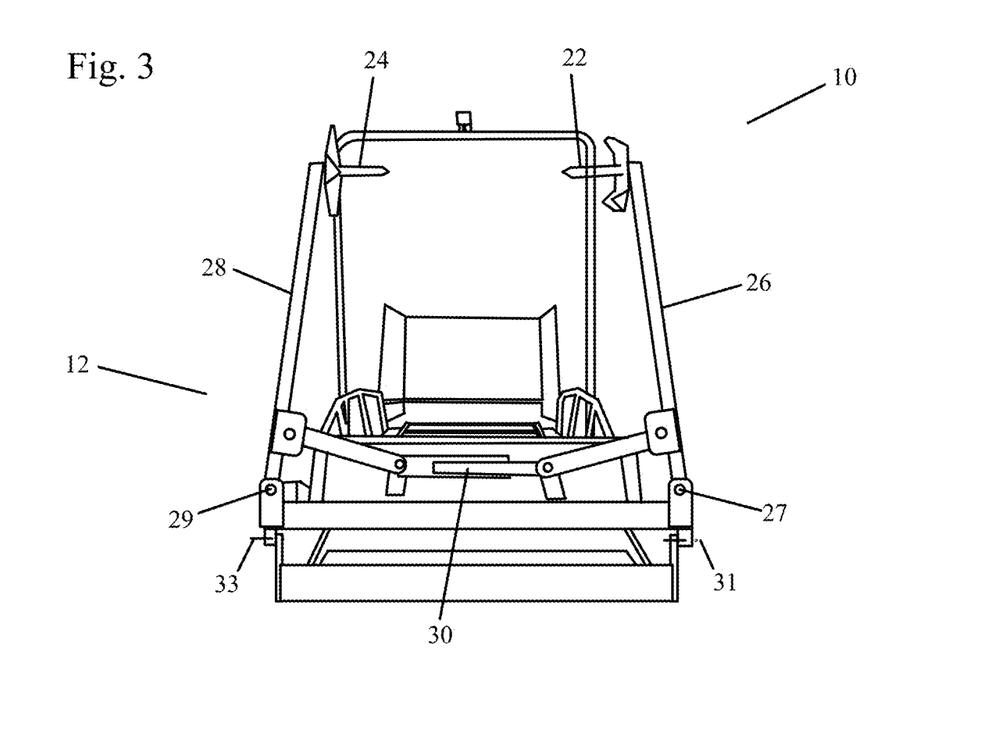
FIG. 3 shows a rear view of the apparatus, according to an embodiment.
Figure 4:
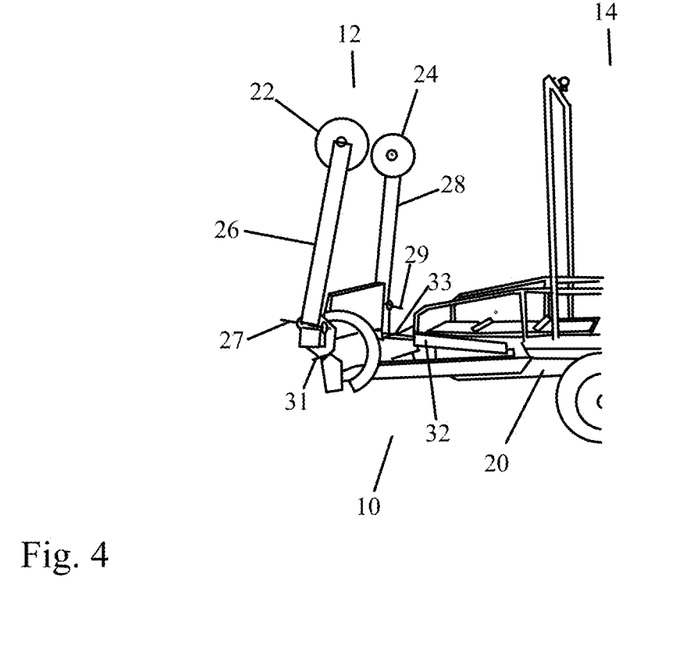
FIG. 4 shows a side perspective view of a bale picking assembly and a frame.
Figure 5:
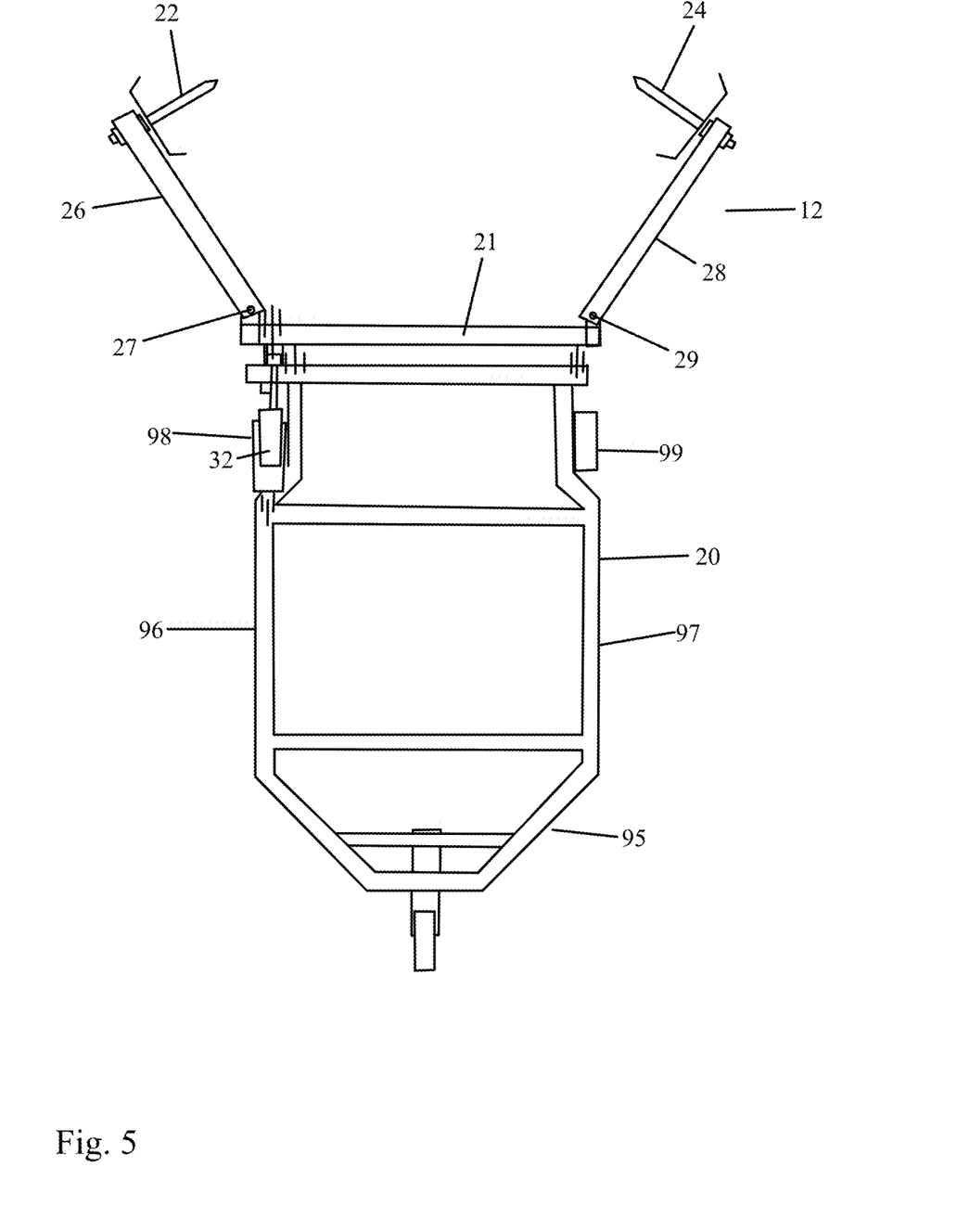
FIG. 5 shows a top view of the bale picking assembly and the frame of FIG. 4.

FIG. 3 shows a rear view of the apparatus 10, FIG. 4 shows a side perspective view of the bale picking assembly 12, and FIG. 5 shows a top view of the bale picking assembly 12 and the frame 20 for the apparatus 10. As shown in FIG. 1-5, the bale picking assembly 12 comprises a first spike 22 and a second spike 24 opposing or pointed at the first spike 22. Each spike 22, 24 can instead be a rod, claw, or other now-known or future-developed clamping or gripping instrument. The first spike 22 is on a first pivot arm 26, and the second spike 24 is on a second pivot arm 28. Each pivot arm 26, 28 is pivotable toward and away from the other pivot arm 26, 28 to swing the spikes 22, 24 toward and away from each other. The arms 26, 28 pivot around a respective first pivot axis 27, 29 located at a rearward end 21 of frame 20. In an open position with the spikes 22, 24 pivoted away from each other, the spikes 22, 24 can be positioned on opposite sides of a bale. When the spikes 22, 24 are positioned thusly, the pivot arms 26, 28 can be pivoted toward each other to a closed position, such that the spikes 22, 24 are thrust into opposite sides of the bale 13, to clamp the bale 13.

The first pivot arm 26 and the second pivot arm 28 are each also pivotable along a respective arc in a vertical plane, around respective second pivot axes 31, 33 located adjacent first pivot axes 27, 29 at the rear end 21 of the frame 20. In other words, the first and second pivot arms 26, 28 are also pivotable in parallel arcs. When the bale picking assembly 12 secures the bale 13 with the spikes 22, 24 between the pivot arms 26, 28, the pivot arms 26, 28 are then capable of pivoting up and over the bale conveying assembly 14, where it can again pivot the pivot arms 26, 28 to the open position, to remove the spikes 26, 28 from the bale 13 and release the bale 13 onto the bale conveying assembly 14.

The pivot arms 26, 28 can be pivoted toward and away from each other by a first actuator 30, and pivoted vertically, in parallel arcs by a second actuator 32. Each actuator 30, 32 can be any now-known or future-developed actuator. The presently described embodiment utilizes a hydraulic ram for each actuator. The clamping and lifting motions of the arms 26, 28 can also be linear or another path that moves the spikes 22, 24 toward and/or away from each other to clamp and/or release a bale, and to lift and/or lower a bale.

Referring again to FIG. 1, the bale conveying assembly 14 includes a feed conveyor 34 extending from the bale picking assembly 12 to the bale cutting assembly 16. The feed conveyor 34 is supported on the apparatus frame 20. The feed conveyor 34 can include a conveyor motor 36 and drive element 38, at least two gears 40, 42, and a conveyor belt 44. As the conveyor belt 44 rotates, bale rides along the top of the conveyor belt 44, generally stationary with respect to the conveyor belt 44 to which the bale is in direct contact, thereby moving toward and onto the bale cutting assembly 16. Some small rolling, rocking, shifting, or other movement might occur that does not impede the overall transportation of the bale across the bale conveying assembly 14 to the bale cutting assembly 16.

Figure 6:
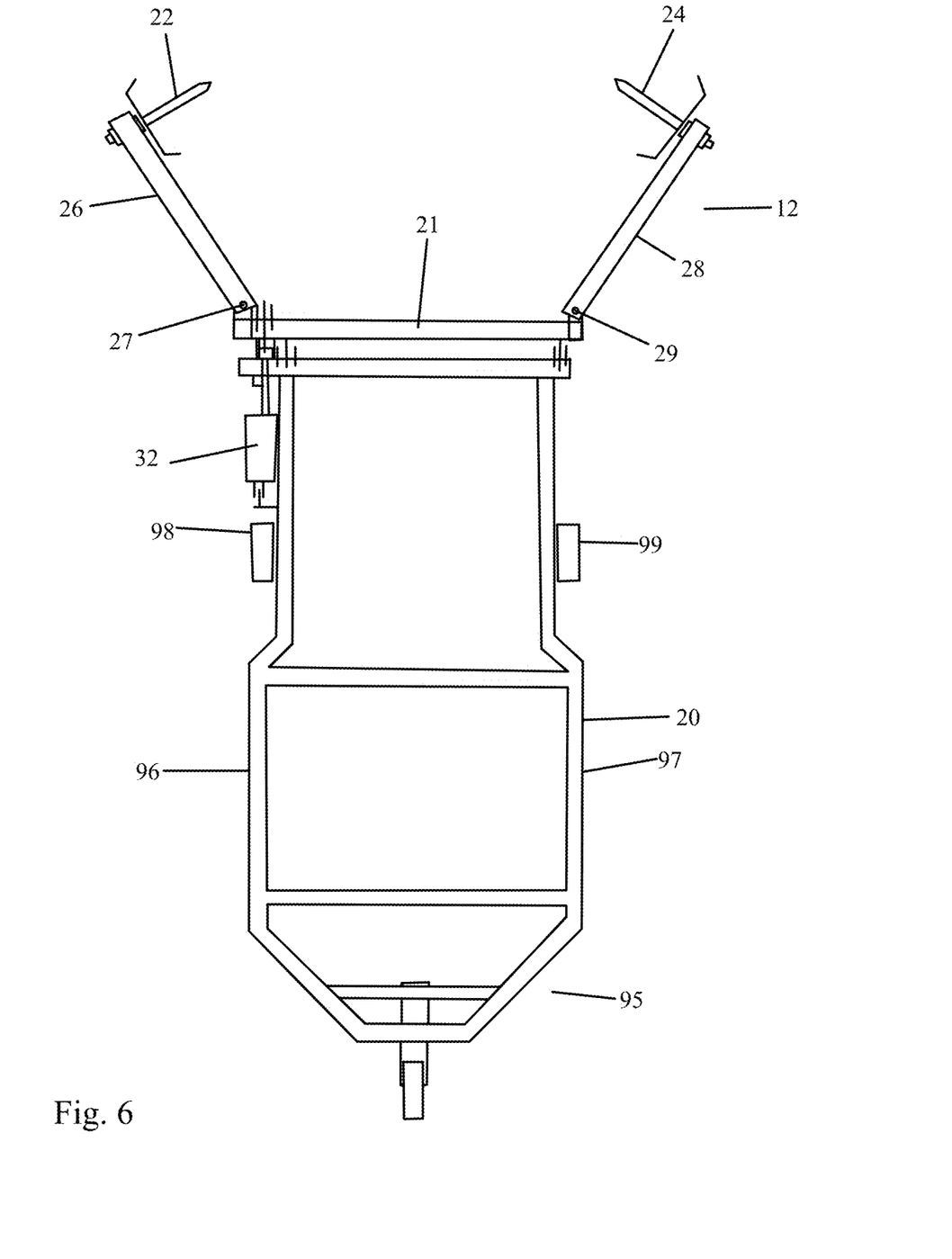
FIG. 6 shows a frame dimensioned for a bale conveying assembly, according to an embodiment.

FIG. 5 illustrates the frame 20 as dimensioned for the bale conveying assembly 14 to convey one standard round bale (e.g. a 4 foot diameter bale) at a time. FIG. 6, by contrast, illustrates the frame 20 dimensioned for the bale conveying assembly 14 to convey multiple standard round bales at a time. In FIG. 6, the frame 20 is longer to accommodate a longer feed conveyor 34, upon which multiple bales can be supported simultaneously. In some embodiments at least one bale 13 can be supported on the bale conveying assembly 14, one bale 13 can be held in the bale picking assembly 12, and one bale 13 can be held in the cutting assembly 16. In some embodiments, two or more bales 13 can be supported on the bale conveying assembly 14.

Figure 11:
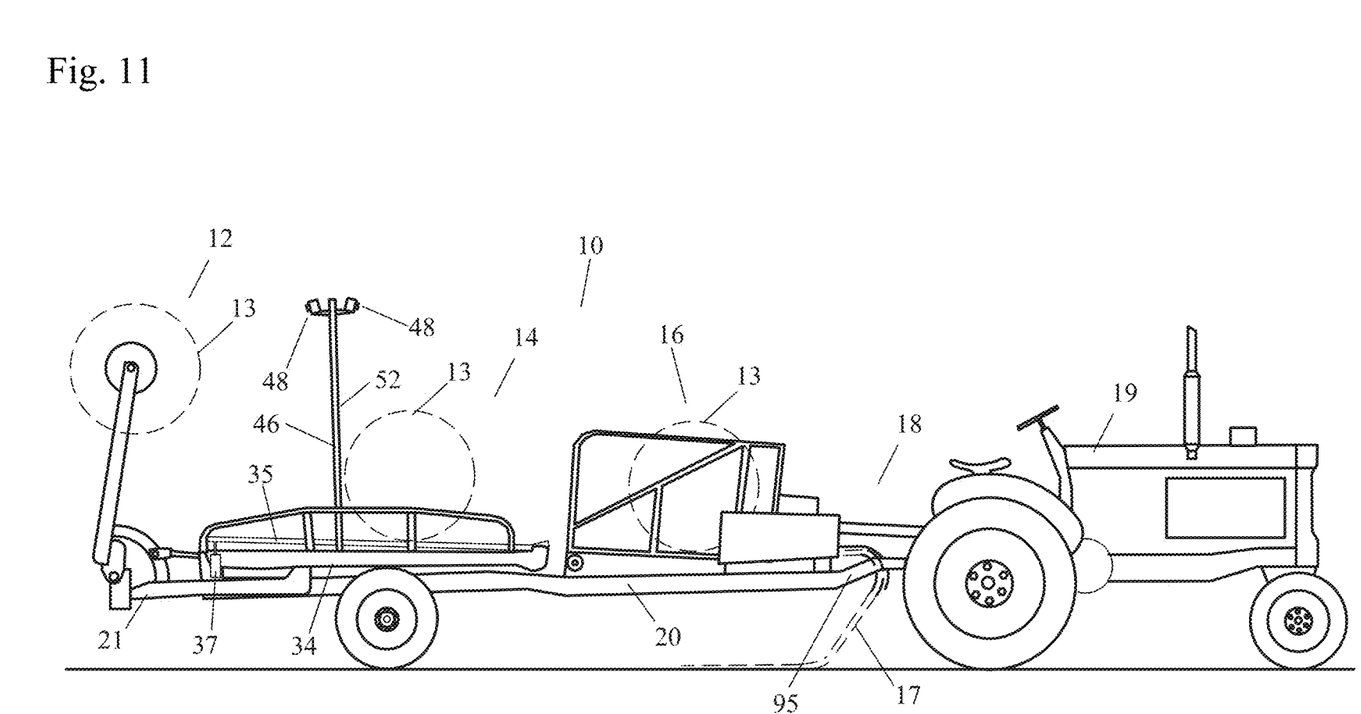
FIG. 11 shows an embodiment of the apparatus for loading, handling, and un-baling bales of FIG. 1.

FIG. 11 shows an alternative embodiment of the bale conveying assembly 14 in which the feed conveyor 34 is replaced with a bale conveying tip plate 35. The bale conveying tip plate 35 can be a plate that is actuated, such as by a bale conveying hydraulic ram 37, to slope forward and bias the bale 13 forward toward the cutting assembly 16 by gravitational force.

Referring again to FIG. 1, the bale conveying assembly 14 can include side rails or side guides 45 to facilitate retention of the bale on conveyor belt 44 (i.e., to reduce the chance the bale 13 will fall off the side of the conveyor belt 44). Further, the bale conveying assembly 14, or another location along the frame 20 between the bale picking assembly 21 and the dispersing assembly 18, can include a camera system 46. The conveying assembly 14 can provide an advantageous central location from front to rear of the apparatus 10 to station the camera system 46, to gain a good viewing point. Other areas along the length of the apparatus 10 could be suited to locate the camera system, as well, though. The camera system 46 includes one or more cameras 48, 50 to provide an operator the ability to more easily navigate and oversee operation of the apparatus 10. In FIG. 1, a front camera 48 and a rear camera 50 are illustrated. Any number of cameras can be used, however. The cameras 48, 50 can be mounted on a shaft or pole 52. The pole 52 can extend vertically or upward from the feed conveyor 34 or frame 20 to a height above the height of a bale, so that the view of the cameras 48, 50 mounted at the top of the pole 52 will not be obstructed by the bale. In some instances, in which round bales are four feet in diameter, the cameras 48, 50 are mounted at least four feet above the conveyor belt 44 or frame 20.

Figure 7:
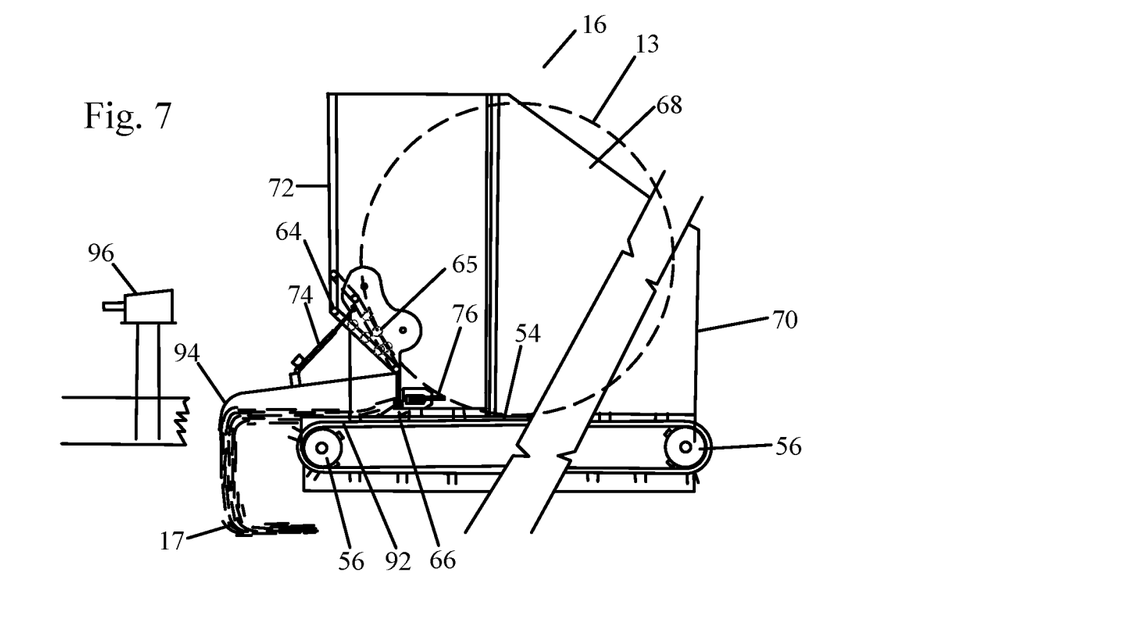
FIG. 7 shows a side view of a bale cutting assembly, according to one embodiment.
Figure 8:
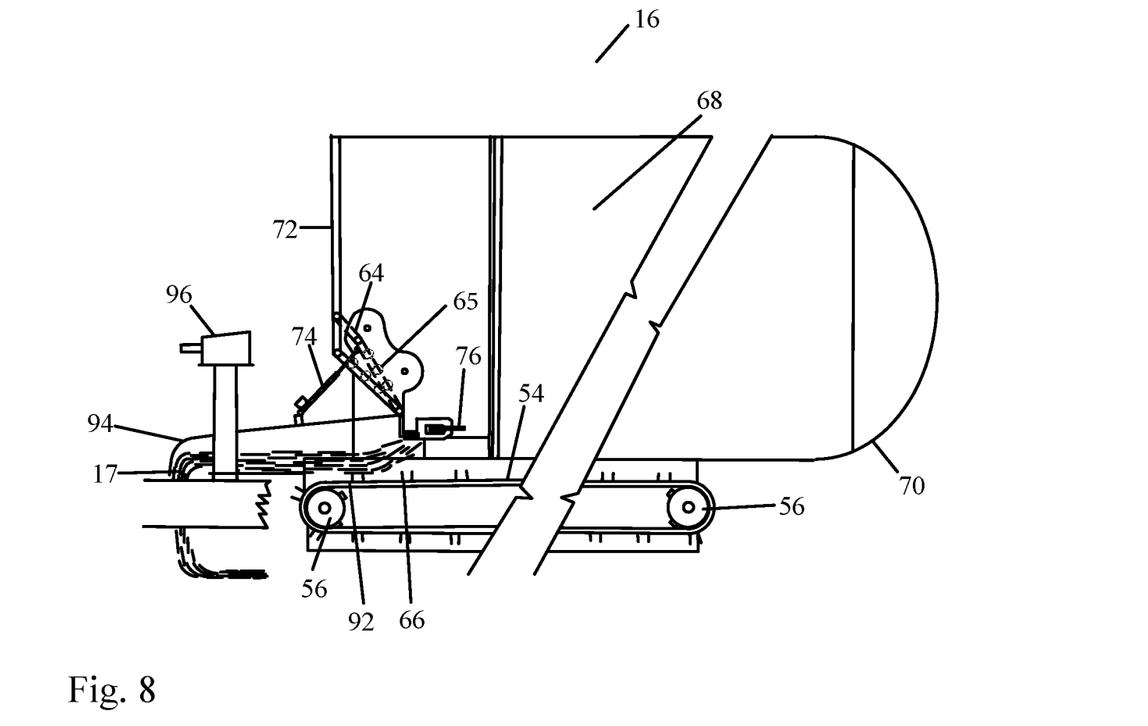
FIG. 8 shows a side view of a bale cutting assembly, according to one embodiment.
Figure 9:
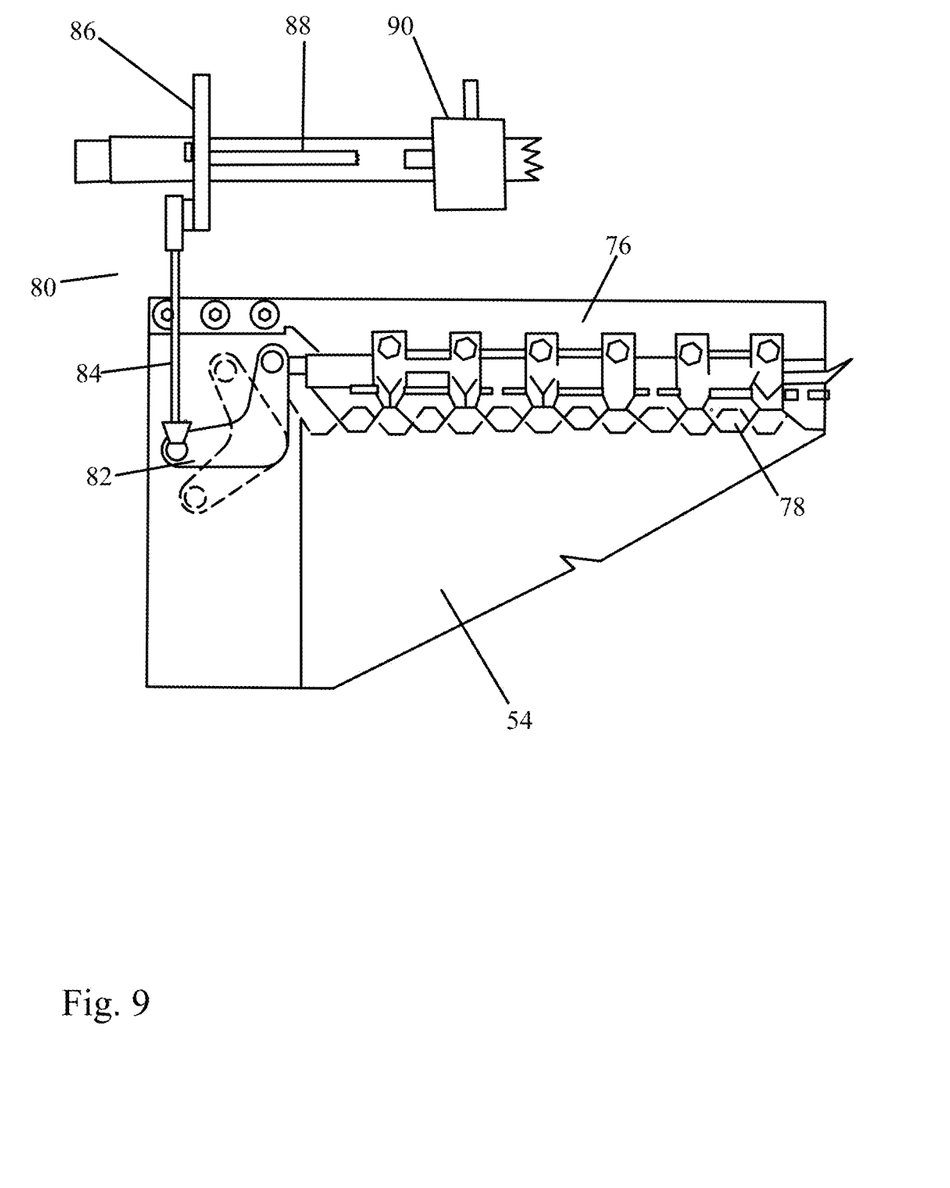
FIG. 9 shows a top view illustrating a reciprocating blade cutter, according to one embodiment.
Figure 12:
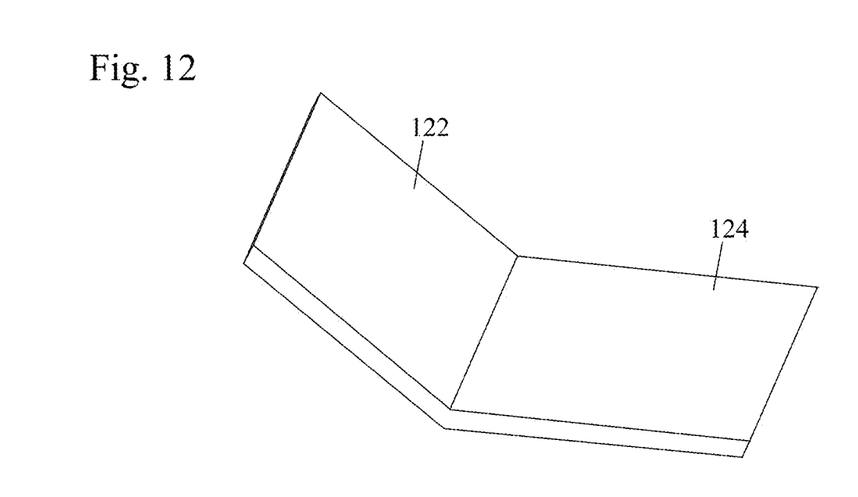
FIG. 12 shows a side view of a bale cutting tip plate, according to one embodiment.
Figure 13:
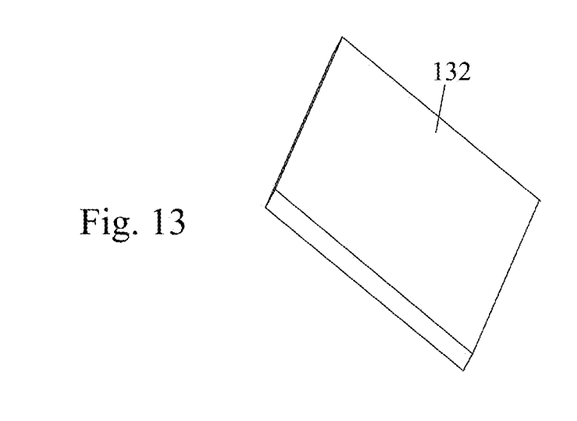
FIG. 13 shows a side view of a bale cutting tip plate, according to one embodiment.

Still referring to FIG. 1, from the bale conveying assembly 14, the bale 13 can be loaded into the bale cutting assembly 16. In addition to FIG. 1, the bale cutting assembly 16 is illustrated in FIGS. 7, 8, and 9. The bale cutting assembly 16 can include a cutting conveyor 54, upon a first side of which the bale 13 can be received from the bale conveying assembly 14 or the bale picking assembly 12. The cutting conveyor 54 can be an extension of the conveyor 44 or a separate conveyor with separate cutting conveyor gears 56, 58, cutting conveyor motor 60, and cutting conveyor drive element 62. The bale cutting assembly 16 can also include a bale cutting tip plate 53 positioned at the entrance to the bale cutting assembly 16 from the bale conveying assembly 14. The bale cutting tip plate 53 can be actuated, such as by a bale cutting hydraulic ram 55, to slope forward and bias the bale 13, by gravitational force, from the bale conveying assembly 14 onto the cutting conveyor 54 of the bale cutting assembly 16. Referring to FIG. 12, the bale cutting tip plate 53 can be a pivoting cradle 120 (e.g., a first plate 122 with a first flat portion, a second plate 124 with a second flat portion, and a bend 126 connecting therebetween) that pivots from a first position with the first plate 122 parallel with the conveyors 44, 54 and the second plate 124 inclined with respect to the conveyors 44, 54, to a second position with the second plate 124 parallel with the conveyors 44, 54 and the first plate 122 inclined with respect to the conveyors 44, 54. Referring to FIG. 13, the bale cutting tip plate 53 can also be a singular flat plate 132 that pivots from a first position with the singular flat plate 132 parallel with the conveyors 44, 54 to a second position with the singular flat plate 132 inclined with respect to the conveyors 44, 54.

Referring again to FIGS. 1 and 7-9, the cameras 48, 50 can be mounted at least four feet above the cutting conveyor 54. The cutting conveyor 54 moves the bale 13 into and against a bale stop element 64, which is supported in the bale cutting assembly 16 above the cutting conveyor 54 at a forward end 66 of the cutting conveyor 54. The bale stop element 64 can include one or more plates, and in some embodiments at least one roller 65, such that when the bale 13 is pushed against the bale stop element 64, as the cutting conveyor 54 continues to move, the bale rotates, guided by the bale stop element 64.

The bale conveying assembly 14 can also include bale conveying assembly side guides 68, which are positioned on opposing sides of the bale conveying assembly 14 running from an entrance end 70 of the bale conveying assembly 14 to an exit end 72 of the bale conveying assembly 14. The bale conveying assembly side guides 68 help restrict lateral movement of the bale, to keep the bale in position rolling against the bale stop element 64, which in turn facilitates accurate cutting of the bale, as is further described herein below. The embodiment shown in FIG. 8 has a longer frame 20 and bale conveying assembly side guides 68, to accommodate more bales than the embodiment shown in FIG. 7.

The bale stop element 64 can be adjustable between a forward position and a rearward position, forward being in the direction the cutting conveyor conveys the bale (i.e., toward the exit end 72), and rearward being toward the entrance end 70. To accommodate differently sized bales, and/or to adjust while the bale is reduced in diameter during cutting, the bale stop element 64 can be adjusted between the forward position and the rearward position. The bale stop element 64 can be adjusted by any now-known or future-developed mechanics. For example, an actuator 74 can be activated to apply force to pivot or otherwise move the bale stop element 64 between the forward and rearward positions.

As the bale 13 is rotated against the bale stop element 64, the bale cutting assembly 18 cuts the mat 17 from the bale 13 near the cutting conveyor 54. FIGS. 1, 7, and 8 illustrate the bale cutting assembly 16. The bale cutting assembly 16 includes a reciprocating blade cutter 76 between the bale stop element 64 and the cutting conveyor 54. FIG. 9 is a top view illustrating the reciprocating blade cutter 76. Referring to FIGS. 1, 7, 8, and 9, the cutter 76 has a blade 78 configured to reciprocate and cut or saw the bale 13 into the mat 17 as the bale 13 rotates. The blade 78 is coupled with a blade driving element 80, which in the embodiment depicted in FIG. 9, is an assembly including a pivoting element 82 coupled to the blade 78, a piston 84 directly coupled to the pivoting element 82, a disc 86 directly coupled to the piston 84, a shaft 88 directly coupled to the disc 86, and a cutter motor 90 directly coupled to the shaft 88. The cutter motor 90 drives rotation of the shaft 88, which rotates the disc 86. The rotation of the disc 86 drives the piston 84 in a linearly oscillating motion, which drives the pivoting element 82 to pivot, which in turn translates into a linearly oscillating motion of the blade 78 perpendicular to the linearly oscillating motion of the piston 84. The blade 78 is positioned above the conveyor at the approximate thickness desired for the bale to be cut (i.e. at the approximate thickness desired for the resulting mat). As the bale rotates, the blade 78 reciprocates to cut, slice, or saw a thickness of mat from the bottom of the bale, a designated height above the cutting conveyor 54. It should be noted that the reciprocating blade cutter 76, including the blade 78 and the driving element 80, can be substituted with a variety of now-known or future developed cutters.

Referring to FIGS. 1, 7, 8, and 9, the dispersing assembly 18 can be coupled at a longitudinally rear end 91 with the bale cutting assembly 16, and the mat 17 produced at the cutting assembly 16 can be fed under the blade 76 to the dispersing assembly 18. The dispersing assembly can include a dispersion conveyor 92 and a dispersion guide 94. The dispersion conveyor 92 can be a section of the feed conveyor 34 and/or the cutting conveyor 54 that extends beyond the blade 76, or the dispersion conveyor can be a separate conveyor with its own gears (not shown) and driving elements (not shown) similar to that of the feed conveyor 34 or cutting conveyor 54. The dispersing assembly 18 has an exit 93 longitudinally forward from the longitudinally rear end 91, and the dispersion conveyor 88 can facilitate movement of the mat 17 to exit the front of the apparatus 10 along the longitude at the exit 93. Alternatively, the cutting conveyor 54 can end with the exit 93 end at the blade 78, and there can be no dispersion conveyor 92 beyond the blade 78.

In either case, the dispersion guide 94 is coupled to a forward end 95 (FIGS. 5, 6) of the frame 20 at a designated distance beyond the cutting conveyor 54 or the dispersion conveyor 92 to redirect the mat 17 downward beneath the apparatus 10. Forward movement of the apparatus 10 can assist laying the mat 17 as the apparatus 10 moves forward. In some embodiments, though, the dispersion guide 94 is bent downward beneath the conveyors 54, 92 greater than 90 degrees from a plane defined by a surface of the dispersion conveyor 92 or cutting conveyor 54, the bend of the dispersion guide 94 greater than 90 degrees directs the mat 17 downward and toward the rear of the apparatus 10 (i.e., opposite from a direction the conveyors 54, 92 convey the mat). This bend facilitates laying the mat 17. The bend of the dispersion guide 94 can be an arc or curl to uniformly or somewhat uniformly redirect the mat 17 over a length, and thereby minimize any abrupt direction change which might cause the mat to bunch or jam.

With or without the dispersion guide 94, the dispersing assembly feeds the mat 17 in a forward direction out of the apparatus 10, the forward direction being from the bale picking assembly toward a forward end of the frame 20 where the frame 20 can be coupled with a motorized vehicle. The mat 17 is fed on a top side 101 of the frame 20 in the forward direction between lateral sides 96, 97 (see FIGS. 5 and 6) and/or between wheels 98, 99 (see FIGS. 5 and 6). The lateral sides 96, 97 extend on opposing sides of the frame 20 from the rearward end 21 to the forward end 95, and the top side 101 and a bottom side 103 extend between the forward end 95, the rearward end 21, the first lateral side 96, and the second lateral side 97.

Each component or assembly of the apparatus 10 can be controlled by a human operator using a controller, such as controller 96, which can be located beyond the dispersing assembly 18 from the bale picking assembly 12, to be accessible to a driver or operator of the apparatus 10. The controller 96 can be in electrical communication with, and can control, any of the bale picking assembly 12, the bale conveying assembly 14, the bale cutting assembly 16, and the dispersing assembly 18, including, but not limited to, the actuators 30, 32 to move the pivot arms 26, 28, one or more conveyor motors 36 to move the conveyor belts 44, 54, 92, the actuator 74 to adjust the bale stop element 64, and the cutter motor 90 reciprocate the cutting blade 76.

Figure 10:
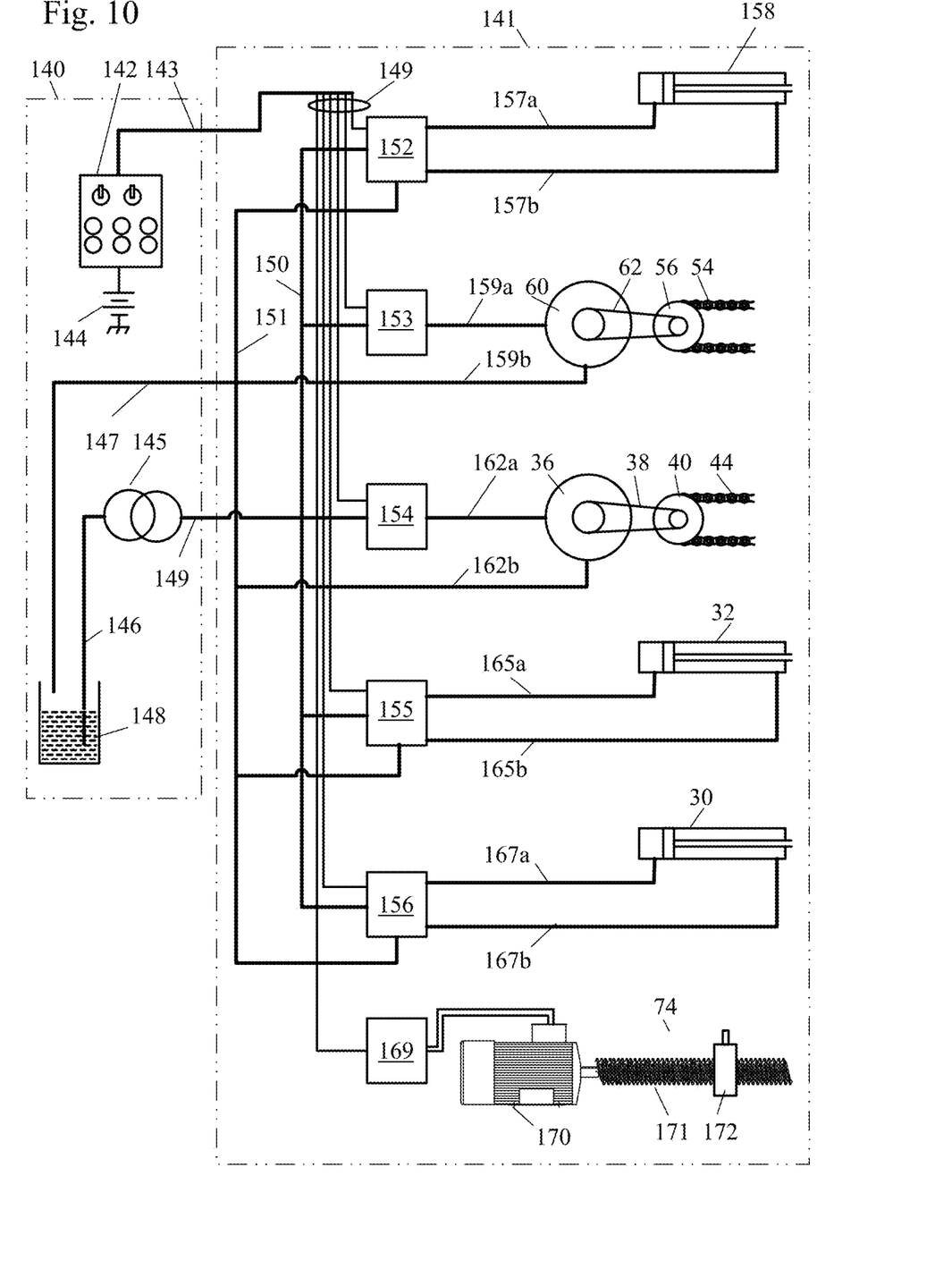
FIG. 10 shows a schematic diagram of a control system for an apparatus for loading, handling, and un-baling bales.

FIG. 10 shows a functional block diagram of an embodiment of a control system for use with a de-baler as described above. In the diagram, components within dashed line 140 are preferably located within the power source of the unroller (for example, tractor 19 of the towed version or power cab 119 of the self-propelled version), with control box 142 located near the operator of the apparatus 100 and connected to an electrical power source such as the power cab battery and generator 144. A hydraulic pump 145 pumps hydraulic fluid from a reservoir 148 through a pickup line 146, and pressurized fluid is supplied through a line 149. Used fluid is returned to the reservoir 148 by return line 147.

Components enclosed in dashed line 141 are located on the operating part of the apparatus (that is, the trailer of the towed version, or the rear half of the self-propelled version). A pressure manifold 150 is hydraulically coupled to the pressurized fluid line 149, and distributes hydraulic fluid under pressure to the components through electrically-operated valves 152, 153, 154, 155 and 156. Used hydraulic fluid is returned through the valves 152-156 to return manifold 151. An electrical distribution bus 149 connects the valves 152-156 to control line 143, which in turn is connected to the control box 142 in the power cab. Control relays for any electrically-powered apparatus can also be coupled to lines in the bus 149, for example control relay 169, as could any directly-controlled mechanisms (not shown).

Components on the apparatus 100 which are controlled by the control box 142 through the bus 149 include hydraulic rams 158, 30 and 32, hydraulic motors 60 and 36, and electric motor 170.

Hydraulic rams 30 and 32 operate the bale loader 12.

Hydraulic ram 30 is connected to valve 156 by lines 167a and 167b. When valve 156 supplies pressurized fluid from manifold 150 to line 167a, pressurizing the chamber on the left side of the ram 30 in the figure, the ram 30 extends, while fluid is pushed out of the chamber on the opposite side of the ram 30 through line 167b and into return manifold 151. This causes the arms 26 and 28 of the bale loader 12 to open outwardly. Similarly, to cause the ram 30 to retract, valve 156 supplies pressurized fluid from manifold 150 to line 167b, pressurizing the chamber on the right side of the ram 30 in the figure. The ram 30 then retracts, while fluid is pushed out of the chamber on the opposite side of the ram 30 through line 167a and into return manifold 151. This causes the arms 26 and 28 of the bale loader 12 to close inwardly, gripping a bale between the arms.

Hydraulic ram 32 is connected to valve 155 by lines 165a and 165b. When valve 155 supplies pressurized fluid from manifold 150 to line 165a, pressurizing the chamber on the left side of the ram 32 in the figure, the ram 32 extends, while fluid is pushed out of the chamber on the opposite side of the ram 32 through line 165b and into return manifold 151. This causes the arms 26 and 28 of the bale loader to pivot, moving the spikes 22 and 24 rearwardly toward the ground to capture a bale. Similarly, to cause the ram 32 to retract, valve 155 supplies pressurized fluid from manifold 150 to line 165b, pressurizing the chamber on the right side of the ram 32 in the figure. The ram 32 then retracts, while fluid is pushed out of the chamber on the opposite side of the ram 32 through line 165a and into return manifold 151. This causes the arms 26 and 28 of the bale loader to pivot, moving the spikes 22 and 24 forwardly, picking up the bale and moving it to the conveyor 44 or 54.

Hydraulic motors 36 and 60 power the cutting conveyor 54 and feed conveyor 44, respectively. In the embodiment of FIG. 11, the hydraulic motor 36 could power the bale conveying tip plate 35, instead of the feed conveyor 44. In this case the hydraulic ram 55 (FIG. 1) and bale conveying tip plate 35 (FIG. 1) would replace the motor 36, the drive element 38, and the feed conveyor 44.

Valve 154 opens to supply hydraulic fluid from the pressure manifold 150 through line 162a to the motor 36, and used fluid from the motor 46 exhausts through line 162b to return manifold 151. Motor 36 drives gear 40 through drive element 38, causing the feed conveyor 44 to move.

Similarly, valve 153 opens to supply hydraulic fluid from the pressure manifold 150 through line 159*a* to the motor 60, and used fluid from the motor 60 exhausts through line 159*b* to return manifold 151. Motor 60 drives gear 56 through drive element 62, causing the cutting conveyor 54 to move.

Electric motor 170, threaded shaft 171 and threaded collar 172 comprise actuator 74 (FIG. 8). Control relay 169 supplies electrical power to electric motor 170, to cause threaded shaft 171 of the motor 170 to rotate in a selected direction. As the threaded shaft 171 rotates, the threaded collar 172 is moved in a linear direction inward or outward on the threaded shaft 171, which moves the bale stop element 64 (FIG. 8). Alternatively, as with each actuator, actuator 74 can be hydraulically operated, or operated by any now-known or future developed actuation method.

Hydraulic ram 158 is connected to valve 152 by lines 157*a* and 157*b*. When valve 152 supplies pressurized fluid from manifold 150 to line 157*a*, pressurizing the chamber on the left side of the ram 158 in the figure, the ram 158 extends, while fluid is pushed out of the chamber on the opposite side of the ram 158 through line 157*b* and into return manifold 151. Similarly, to cause the ram 158 to retract, valve 152 supplies pressurized fluid from manifold 150 to line 157*b*, pressurizing the chamber on the right side of the ram 158 in the figure. The ram 158 then retracts, while fluid is pushed out of the chamber on the opposite side of the ram 158 through line 157*a* and into return manifold 151. Hydraulic ram 158 is not shown in the other figures, but could be any sort of hydraulic actuator as needed by the apparatus.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A bale unroller comprising:
   a longitude;
   a bale cutting assembly including a forward end, a cutting conveyor and a cutting element, the cutting conveyor having a first side configured to receive and convey a bale, the cutting conveyor having a second side opposite the first side, the cutting conveyor configured to convey in a longitudinally forward direction along the longitude to the forward end, the cutting element configured to cut the bale into a mat; and
   a dispersing assembly having a longitudinally rear end, the dispersing assembly coupled at the longitudinally rear end with the forward end of the bale cutting assembly, the dispersing assembly having an exit longitudinally forward from the longitudinally rear end, the dispersing assembly configured to receive the mat from the bale cutting assembly and feed the mat out the bale unroller through the exit along the longitude to the second side of the cutting conveyor.

2. The bale unroller of claim 1, wherein the dispersing assembly includes a dispersion conveyor and a dispersion guide, the dispersion guide extending forward longitudinally from the dispersion conveyor, the dispersion guide bent in a direction from the first side of the cutting conveyor to the second side of the cutting conveyor, and from the forward end of the dispersing assembly in a longitudinally rearward direction.

3. The bale unroller of claim 2, wherein the dispersion guide is bent greater than 90 degrees from a plane defined by the first side of the cutting conveyor, the bend of the dispersion guide greater than 90 degrees to direct the mat opposite from a direction the dispersion conveyor conveys the mat.

4. The bale unroller of claim 1, wherein the bale cutting assembly further includes a bale stop element, the bale stop element supported at a rear end of the cutting conveyor, the cutting conveyor configured with respect to the bale stop element to rotate the bale against the bale stop element.

5. The bale unroller of claim 4, wherein the bale stop element is adjustable between a forward position and a rearward position, forward being in the direction the cutting conveyor conveys the bale, rearward being opposite forward.

6. The bale unroller of claim 4, wherein the bale stop element includes at least one roller.

7. The bale unroller of claim 4, wherein the cutting element includes a reciprocating cutter blade between the bale stop element and the cutting conveyor.

8. The bale unroller of claim 1, further comprising a bale conveying assembly configured to receive the bale and convey the bale to the bale cutting assembly, the bale conveying assembly including a feed conveyor extending to the bale cutting assembly.

9. The bale unroller of claim 1, further comprising a camera system, the camera system including at least one camera mounted on a shaft, the shaft extending to a height at least four feet above the cutting conveyor.

10. The bale unroller of claim 1, further comprising a bale picking assembly configured to clamp the bale and release the bale, the bale picking assembly including a first spike on a first pivot arm and a second spike on a second pivot arm, the second spike opposing the first spike, the first pivot arm and the second pivot arm pivotable opposably along a respective first arc and a respective second arc to grab or release the bale, the first pivot arm and the second pivot arm pivotable along a respective third arc and a respective fourth arc, the third and fourth arc being in parallel planes, the third and fourth arc in planes perpendicular to planes of the first and second arc.

11. The bale unroller of claim 1, further comprising a bale picking assembly configured to clamp the bale and release the bale, the bale picking assembly including a first spike on a first arm, a second spike on a second arm, the second spike opposing the first spike, the first arm and the second arm movable opposably to grab or release the bale, the first arm and the second arm movable in parallel in planes perpendicular to planes of the opposable movement of the first and second arms.

12. The bale unroller of claim 1, wherein the-cutting element includes a cutter, and the cutting conveyor is configured to feed the bale from the first side of the cutting conveyor through a cutting operation of the cutter to the dispersing assembly and the exit of the dispersing assembly.

13. The bale unroller of claim 1, further comprising at least one of a bale conveying assembly configured to receive the bale and convey the bale to the bale cutting assembly and a bale picking assembly configured to clamp the bale and release the bale, the at least one of the bale conveying assembly and the bale picking assembly positioned to a side of the bale cutting assembly opposite the dispersing assembly.

14. An apparatus for de-baling a bale, the apparatus comprising:

a frame having a forward end, a rearward end, a first lateral side, a second lateral side, a top side, and a bottom side, the first lateral side and the second lateral side on opposing sides of the frame, the first lateral side and the second lateral side extending from the rearward end to the forward end, the top side and the bottom side on opposing sides of the frame, the top side and the bottom side extending between the forward end, the rearward end, the first lateral side, and the second lateral side;

a bale cutting assembly on the top side of the frame, the bale cutting assembly configured to receive the bale, to cut the bale into a mat, and to feed the mat toward the forward end; and a dispersing assembly on the top side of the frame, the dispersing assembly coupled to the frame forward of the cutting assembly at the forward end of the frame, the dispersing assembly configured to feed the mat out of the apparatus forward from the bale cutting assembly on the bottom side between the first lateral side and the second lateral side.

15. The apparatus of claim 14, wherein the dispersing assembly includes a dispersion conveyor and a dispersion guide, the dispersion guide on the top side of the frame, extending in a first direction from the rearward end of the frame to the forward end of the frame, the dispersion guide bent in a direction from the top side of the frame to the bottom side of the frame to direct the mat from the top side of the frame to the bottom side of the frame.

16. The apparatus of claim 14, wherein the bale cutting assembly includes a cutting conveyor and a bale stop element, the bale stop element supported at a rear end of the cutting conveyor, the cutting conveyor configured with respect to the bale stop element to rotate the bale against the bale stop element.

17. The apparatus of claim 16, wherein the bale stop element is adjustable between a forward position and a rearward position, forward being in the direction the cutting conveyor conveys the bale, rearward being opposite forward.

18. The apparatus of claim 16, wherein the bale cutting assembly includes a reciprocating cutter blade between the bale stop element and the cutting conveyor.

19. The apparatus of claim 14, further comprising a bale conveying assembly configured to receive the bale and convey the bale to the bale cutting assembly, the bale conveying assembly coupled to the frame rearward from the bale cutting assembly, the bale conveying assembly including a feed conveyor extending to the bale cutting assembly.

20. The apparatus of claim 14, further comprising a camera system, the cutting assembly comprising a cutting conveyor, the camera system including at least one camera mounted on a shaft, the shaft extending to a height at least four feet above the cutting conveyor.

21. The apparatus of claim 14, further comprising a bale picking assembly configured to pick a bale, the bale picking assembly coupled to the frame at the rearward end, the bale picking assembly including a first spike on a first pivot arm, a second spike on a second pivot arm, the second spike opposing the first spike, the first pivot arm and the second pivot arm pivotable opposably along a respective first arc and a respective second arc to grab or release the bale, the first pivot arm and the second pivot arm pivotable along a respective third arc and a respective fourth arc, the third and fourth arc being in parallel planes, the third and fourth arc in planes perpendicular to planes of the first and second arc.

22. The apparatus of claim 14, further comprising a bale picking assembly configured to pick a bale, the bale picking assembly coupled to the frame at the rearward end, the bale picking assembly including a first spike on a first arm, a second spike on a second arm, the second spike opposing the first spike, the first arm and the second arm movable opposably to grab or release the bale, the first arm and the second arm movable in parallel in planes perpendicular to planes of the opposable movement of the first and second arms.

23. The apparatus of claim 14, wherein the bale cutting assembly includes a cutter, and the bale cutting assembly is configured to feed the bale through a cutting operation of the cutter to the dispersing assembly and the exit of the dispersing assembly.

24. The apparatus of claim 14, further comprising at least one of a bale conveying assembly configured to receive the bale and convey the bale to the bale cutting assembly and a bale picking assembly configured to clamp the bale and release the bale, the cutting assembly being between the dispersing assembly and the at least one of the bale conveying assembly and the bale picking assembly.

* * * * *